United States Patent [19]
Onysko et al.

[11] Patent Number: 5,267,425
[45] Date of Patent: Dec. 7, 1993

[54] I-BEAM JOINT

[75] Inventors: Donald M. Onysko, Gloucester; W. H. Ernest Hsu, Orleans, both of Canada

[73] Assignee: Forintek Canada Corp., Ottawa, Canada

[21] Appl. No.: 713,149

[22] Filed: Jun. 11, 1991

[51] Int. Cl.⁵ .............................................. E04C 3/00
[52] U.S. Cl. ................................... 52/729; 52/730.7; 403/381
[58] Field of Search ......................... 52/729, 730, 690; 403/227, 381, 354

[56] References Cited
U.S. PATENT DOCUMENTS

| | | | |
|---|---|---|---|
| 3,960,637 | 6/1976 | Ostrow | 52/729 |
| 4,191,000 | 3/1980 | Henderson | 52/729 |
| 4,195,462 | 4/1980 | Keller et al. | 52/730 |
| 4,413,459 | 11/1983 | Lambuth | 52/729 |
| 4,584,809 | 4/1986 | Stanford | 52/729 |
| 4,715,162 | 12/1987 | Brightwell | 52/729 |
| 4,974,389 | 12/1990 | Onysko et al. | 52/729 |

*Primary Examiner*—Carl D. Friedman
*Assistant Examiner*—Wynn Wood
*Attorney, Agent, or Firm*—Dickinson, Wright, Moon, Van Dusen & Freeman

[57] ABSTRACT

There is provided a new and useful wooden structural member comprising a pair of elongated flanges each having a surface and a longitudinally extending groove in the surface, the groove having a bottom, and wherein at least one side of the groove is at an angle to the surface such that the groove is tapered from the surface to the bottom; an upwardly projecting compression ridge extending longitudinally along the bottom of the groove; and a web disposed between the flanges and having first and second longitudinal edges, at least one side of the edges being tapered, the edges secured within respective ones of the grooves, and each edge having a longitudinally extending central kerf therein, the depth of the kerfs being greater than the depth of the grooves; and wherein (a) prior to the insertion of the edges into the grooves, (i) the thickness of each edge at its extremity is not greater than the width of the bottom of the groove, and (ii) the thickness of each edge at a distance from its extremity equal to the depth of the grooves is greater than the width of the grooves at the surface of the flange, (b) the width of the compression ridge at its base is at least equal to the width of the kerf at its outer extremity, and (c) the height of the ridge is substantially less than the depth of the kerf.

36 Claims, 3 Drawing Sheets

I-BEAM JOINT

FIELD OF THE INVENTION

This application relates to wooden structural members and to a method for producing such members.

BACKGROUND OF THE INVENTION

Wooden structural members are used increasingly in a number of building applications. This can be seen, for example, in the use of wooden I-beams to replace conventional solid wood 2×8, 2×10 and other size lumber in the supporting structure for floors, roofs and the like. Such structural members can be of substantially greater stiffness than conventional lumber elements and can thus be used over greater spans. Advantages are thus offered for example, in the elimination of supporting division walls and of foundation work below such walls.

As well, old growth large diameter softwoods are gradually disappearing, and consequently suitable long and wide solid wood joists and beams are becoming scarcer and more costly.

There are thus ongoing attempts to develop wooden structural members using in part composite panels and offering advantages in ease of manufacture and reliability.

The structural members under discussion here will comprise flange members which include aligned grooves in opposed surfaces. One or more web members will be positioned between the opposed faces of the flanges with the edges of the web inserted into the grooves.

The primary difficulty in constructing these wooden structural members has been in achieving a good joint between the web and the flanges.

Several types of problems arise in attempting to manufacture wooden I-beams. These relate to the manufacturing process itself, to the glue line achieved during manufacturing and to the problem of swelling due to uptake of moisture which is inherent in the materials used.

The manufacturing problems arise primarily out of the need to manufacture at high speed in order to have an economically viable product. For example, it may well be the case that the use of a jig to hold the components of the member in position during the setting of the glue, which subsequently holds the components together, would in itself eliminate economic viability. Thus, the flange to web joint must be one which can achieve an acceptable glue line without the use of such jigs.

A further manufacturing problem is the rather basic one that the components must be able to be fitted together quickly without irregular or unexpected disruptions during assembly. For example, the edge of the web must move smoothly into the mouth of the groove without interference at the outside edges of the groove.

Problems involved in establishing an acceptable glue line are related to the above manufacturing problems. For example, the web must be readily insertable into the groove in the flange but at the same time, once inserted, must provide good continuous pressure at all points between the interior surfaces of the groove and the exterior surfaces of the inserted part of the web. Furthermore, such a glue line requires good distribution of glue within the joint. Distribution of glue can be seriously impaired if, as discussed above, the edge of the web scrapes along the sides of the groove, scraping glue off the sides as it progresses into the groove.

Both the manufacturing and the glue line problems are related to a third inherent problem which is always present in working with wood. This third problem relates to swelling or shrinkage of wood arising from the changing moisture content of the wood and the changing stresses within the wood. Thus, for example, when a groove is produced in a piece of solid lumber, the release of stress in the wood can cause the groove to open substantially in a short period of time. Similarly, a change in moisture content of the various wooden components can dramatically affect the size of the wood, as, for example, the thickness of the web. It is therefore essential that the joint take into account this problem, since catastrophic failure of the flange may otherwise result.

To date no joint is available which addresses in an adequate way and reconciles differences between all these various types of problems.

Against this background the present invention provides a structural member having an improved web to flange joint.

PRIOR ART

There has been a substantial amount of development in the area of wooden structural members, and the following Patents are of interest in that regard.

Troutner, Canadian Patent 1,039,039, issued Sep. 26, 1978, (U.S. Pat. Nos. 3,490,188 and 3,894,908) illustrates a basic wooden I-beam configuration in which the tapered edges of a web member are inserted into tapered grooves in flange members, the tapered edges intended to exactly fit the tapered grooves.

Ostrow, U.S. Pat. No. 3,960,637, issued Jun. 1, 1976, is of interest in illustrating various pressure distorted edge treatments. Some central tongues are illustrated which completely fill corresponding kerfs.

Henderson, U.S. Pat. No. 4,191,000, issued Mar. 4, 1980, provides flange members including double tapered grooves separated by a tongue which extends into a kerf in the web member. The tongue in each case completely fills the kerf.

Keller, U.S. Pat. No. 3,991,535 issued Nov. 16, 1976, and U.S. Pat. No. 4,195,462, issued Apr. 1, 1980, provide another arrangement in which the flanges include a pair of diverging grooves separated by a tongue which extends into a kerf in the web member. The tongue again completely fills the kerf.

Peters, U.S. Pat. No. 4,336,678, issued Jun. 29, 1982, provides a web member given a particular type of scalloped edge treatment.

Eberle, U.S. Pat. No. 4,456,497, issued Jun. 26, 1984, provides an arrangement in which the flanges include tapered grooves but in which the web member is not tapered. A kerf in the web member permits the edge of the web member to assume something of the shape of the tapered groove.

Brightwell, U.S. Pat. No. 4,715,162, issued Dec. 29, 1987, provides an arrangement in which a particular treatment is given to the tapered edges of the web member.

Finally, Onysko et al. U.S. Pat. No. 4,974,389, issued Dec. 4, 1990 in which the present inventors are also named as co-inventors, shows an improved joint in which a better glue line is obtained than in earlier joints and with improved ease of assembly.

BRIEF SUMMARY OF THE INVENTION

A structural member has now been developed which provides an improved web to flange joint through the provision of an advantageous treatment leading to the resolution of stress problems and an improved glue line. Furthermore, fabrication advantages are provided.

Accordingly, the invention provides a wooden structural member comprising a pair of elongated flanges each having a surface and a longitudinally extending groove in the surface, the groove having a bottom, and wherein at least one side of the groove is at an angle to the surface such that the groove is tapered from the surface to the bottom; an upwardly projecting compression ridge extending longitudinally along the bottom of the groove; and a web disposed between the flanges and having first and second longitudinal edges, at least one side of the edges being tapered, the edges secured within respective ones of the grooves, and each edge having a longitudinally extending central kerf therein, the depth of the kerfs being greater than the depth of the grooves; and wherein (a) prior to the insertion of the edges into the grooves, (i) the thickness of each edge at its extremity is not greater than the width of the bottom of the groove, and (ii) the thickness of each edge at a distance from its extremity equal to the depth of the grooves is greater than the width of the grooves at the surface of the flange, (b) the width of the compression ridge at its base is at least equal to the width of the kerf at its outer extremity, and (c) the height of the ridge is substantially less than the depth of the kerf.

In a further embodiment there is provided a method for the production of wooden structural members comprising forming a longitudinal tapered groove, having a bottom, in a surface of each one of a pair of elongated flanges; positioning an upwardly projecting compression ridge longitudinally along the bottom of the groove; tapering the longitudinal edges of a web such that the thickness of the edges at their extremities is not greater than the width of the bottom of the grooves, and the thickness of the edges at a distance from their extremities equal to the depth of the grooves is greater than the width of the grooves at the surface of the flanges; and forming a longitudinally extending central kerf in the edges, the kerf having a greater depth than the depth of the grooves and a much greater depth than the height of the ridge; applying glue to at least one of either the exterior surfaces of the edges or the interior surfaces of the groove; and inserting the edges into the grooves with the compression ridge projecting into the kerf.

GENERAL DESCRIPTION

As discussed above, there are a range of problems associated with the manufacture and use of wooden structural members. In order to overcome or alleviate the effects of those problems, certain general considerations will apply to new developments with respect to such members. First, in manufacturing terms it is highly desirable that the flanges and web members which generally comprise the components of wooden structural members be capable of very rapid assembly and that no jigs or fasteners such as nails be required to secure the components together during the glue setting step, gluing being the normal means of securing the components together. To achieve a good glue line it is essential, as well, that the surfaces of the grooves in the flange members and the inserted edges of the web members be in continuous and unshifting contact to as great an extent as possible over the entirety of the contiguous surfaces, separated only by the glue film.

Finally, a good web to flange joint must take into account the virtual impossibility of obtaining close tolerances in working with wood, and the effects of swelling on tolerances. Swelling occurs both as a result of moisture uptake and excess glue.

The swelling factor in particular is highly sensitive to the particular material utilized in the web section of the structural member.

The present invention offers advantages in overcoming the above problems through the provision of a structural member comprising flange members having opposed faces which include grooves therein and which are joined by web members the edges of which are inserted into the grooves. The grooves and the edges of the web member are tapered on at least one side, and the edges of the web member are provided with a longitudinally extending central kerf. The bottom of the groove is provided with an upstanding compression ridge. Specific preferred configurations are discussed below.

The term "longitudinal" is intended to mean the dimension along which the web to flange joint will occur and is intended to include variations such as discontinuous webs and waveform joint lines.

It is noted that for purposes of illustration the description is related to a wooden I-beam, but that similar considerations apply to a variety of structural members to which the invention may be applied.

The present invention avoids the difficulties associated with variations of thickness in the web material by using rotating knives to taper at least one side of the web material on the outside walls of the legs and by cutting a kerf the depth of which is greater than the depth of the groove into which the web insert fits.

By tapering at least one of the exterior walls of the legs so that the web insert narrows toward the tip it is easier to feed the web into the groove of the flange material without one leg catching on the face of the flange material to the side of the groove. Consequently fabrication can proceed very quickly. If only one side of the web is tapered, it may be necessary to prepare the untapered side as by sanding. The following discussion is pertinent in that regard.

A further advantage of tapering the exterior walls of the web insert is specifically related to the use of the preferred waferboard/OSB (oriented strand board or oriented structural board) as the web material. Generally, because of its very high in-plane shear strength waferboard/OSB is the material of choice for use as a web material. That material also has drawbacks which must be taken into account. One drawback is that the bare unmodified surface of a sheet of waferboard/OSB glues very poorly. Waferboard/OSB is manufactured by pressing a mixture of wood wafers, glue and wax between two hot metal platens. During the pressing process, surfaces are highly densified and are thus smooth. The densified face bonds poorly because glue has difficulty penetrating that surface. Also it is a common practice that one surface is roughened with a screen during manufacture. The bond to the rough surface is variable because, being rough, some of the surface wafers themselves will not be perfectly bonded to the body of the board.

Consequently, when the exterior walls of a waferboard/OSB web insert are tapered with rotating knives, surface contaminants that can inhibit glue bonding are removed, and, in addition, the glue bond to the tapered exterior wall of the web insert is distributed across several layers of wafers rather than depending exclusively on surface wafers which may, for many reasons, be improperly bonded to the web substrate.

The outer corner of the tip of each leg may be slightly rounded to further assist in guiding the web insert into the groove without interference. A further advantage of this rounding is to permit glue that has been applied on the wall of the groove to ride up under the tip of the leg and remain on the wall rather than being pushed down the wall to the base of the groove. This is of less importance in the present case because the outer corners of the web insert tip are not forced tightly against the wall of the groove until the bottom of the groove has been substantially reached.

It is highly preferred in the present invention that, prior to insertion of an edge into a groove, the thickness of the tapered edge at a distance from its extremity equal to the depth of the groove be greater than the width of the groove at the surface of the flange. It is also preferred, however, that the thickness of the outer extremity of the tapered edge prior to insertion not be greater than the width of the bottom of the groove.

The width of the web insert at its tip contributes to a reduction in the effects of swelling of the insert material. Since the insert is narrowest at its tip due to the tapering of the wall and the optional roundness of the outer tip corners, there is less material in this area to swell and split the flange. Note also that since this material is usually farthest from an exposed region it is less likely than the top of the web insert to pick up humidity, except at the exposed end of an I-beam.

The optional roundness of the corners at the base of the groove also reduces the effects of swelling by the web insert. When the base corners of a groove are sharp as is assumed in most previous inventions of this type, concentrated compression stresses against the groove wall induced by swelling of the web insert will focus at the sharp corner because all forces are abruptly resisted by the body of the wood at the base of the groove. As a result cracks, which can gradually increase in length, tend to develop at such sharp intersections thereby weakening the joint and reducing the strength of the I-beam. A rounded corner substantially reduces the chance of a crack developing because the forces are resisted incrementally as they proceed along the curve.

The presence of a kerf in the edge of the web offers a number of advantages. A primary function of the kerf, however, is to prevent the web insert from splitting the flange when the waferboard or other sheet material of which the web insert is made picks up moisture in the field and swells. It is for this reason that the kerf is preferably open over substantially its entire length.

The depth of the kerf is greater than the depth of the groove so that the top of the kerf is beyond the top of the groove. If the top of the kerf ended in line with or below the top of the groove, then when the web swelled it would push open the groove at the top weakening the joint as previously described. If the top of the kerf was in line with the top of the groove, then swelling of the web would also induce substantial shear stresses in the web between the top of the kerf and the top of the groove weakening the web along this shear stress line.

The depth of the kerf should not be excessive, however, since strength reduction in the web will eventually occur.

A further advantage of locating the top of the kerf above the top of the groove opening is that it makes it possible to cut the groove so that its width at the top is slightly smaller than the width of the web when it is fully inserted; in effect narrowing the kerf at the top of the groove. This feature ensures that the legs of the web insert are pushing hard against the walls of the groove. Such pressure is required to ensure good fiber to fiber contact between the opposing surfaces of the joint while the glue cures. This pressure also ensures that the web insert grips the walls of the groove thereby preventing the flanges from falling off the web insert.

The pressure exerted by the legs against the groove sides is substantially improved by the present invention. The legs separated by the kerf without other influences essentially act as free cantilevers. The shape of a free cantilever loaded by a uniform pressure is curvilinear. However, since the face of the side of the groove is flat and not curvilinear, the pressure achieved by the free cantilever against the surface will not be uniform. Accordingly, the glue bond will not be maximized This problem is corrected by the use of a low, compression ridge running along the bottom of the groove. In its preferred configuration the compression ridge is of rectangular or slightly trapezoidal lower cross-section running centrally between the sides of the groove. The upper part or top of the ridge may have any suitable profile as, for example, to deflect the legs on entry, should they be improperly positioned. The preferred lower cross-sectional shape is chosen to give to the ridge, sides which are sufficiently close to the perpendicular to the bottom of the groove so as not to exert undue outward thrust on the legs which would tend to push the web out of the groove. The base of the compression ridge is preferably just slightly wider than the width of the kerf at the kerf's outer extremity.

With the compression ridge present, the behaviour of the legs during the initial stages of insertion into the web is still as free cantilevers. As insertion is continued so that the compression ridge locates between the legs, the legs deflect from the sides of the compression ridge and are forced back against the surfaces of the sides of the groove. The legs now act substantially as propped cantilevers. The deflected shape of the legs more nearly approximates the straight sides of the groove in the flange to thereby obtain a higher and more uniform glue line pressure.

Bursting pressures on the flange can be further minimized with this arrangement by increasing the depth of the kerf, since the flexibility of the cantilevered fingers is not as critical to the development of pressure for gluing of a propped cantilever as it is for a free cantilever. Pressures on the flange caused by web swelling are thus more readily minimized without compromising the integrity of the glue bonds. As indicated above, however, kerf depth should not be excessive.

The propped cantilever arrangement utilizes a low compression ridge which still leaves a very large section of the kerf open such that subsequent swelling of the legs caused by pickup of moisture can still occur to the inside of the kerf without substantially increasing the wedging stresses on the flange. As well, there is space to take up excess glue squeezed from the bottom of the joint.

The high even pressure exerted by the propped legs against the sides of the groove eliminates the need to hold the flanges in place with a jig or nails or other special devices while the glue line is setting.

It is preferred that the outer edges of the kerf, i.e., the inner edges of the ends of the legs, be slightly rounded off to facilitate interaction with the sides of the compression ridge.

As regards the materials of construction, any continuous solid wood material may be utilized for the flanges. This might include Machine Stress Rated lumber, optionally with finger joints, Laminated Veneer Lumber or Parallel Strand Lumber.

Similarly, the web of the structural member may comprise any suitable wooden sheet material such as plywood, fiberboard or, preferably, waferboard/OSB.

Applicant prefers to utilize Machine Stress Rated Lumber for the flanges and oriented structural board (OSB) for the web.

As indicated above, while the description is based on the illustrated I-beam, other types of structural members such as forms of box beams, trusses, and I-beams with non-parallel flanges may utilize the invention. Furthermore, even within the I-beam category, variations such as wave form grooves and webs, discontinuous webs, and the like, are possible variations. Similarly multiple parallel webs may be utilized.

High quality glues which are suitable for use in the invention will be known to those skilled in the art. Such glues are usually phenol-resorcinol formaldehyde resin, melamine formaldehyde resin or isocyanates.

BRIEF DESCRIPTION OF THE DRAWINGS

In drawings which illustrate embodiments of the invention.

DETAILED DESCRIPTION OF THE PREFERRED EMBODIMENTS

Figure 1:
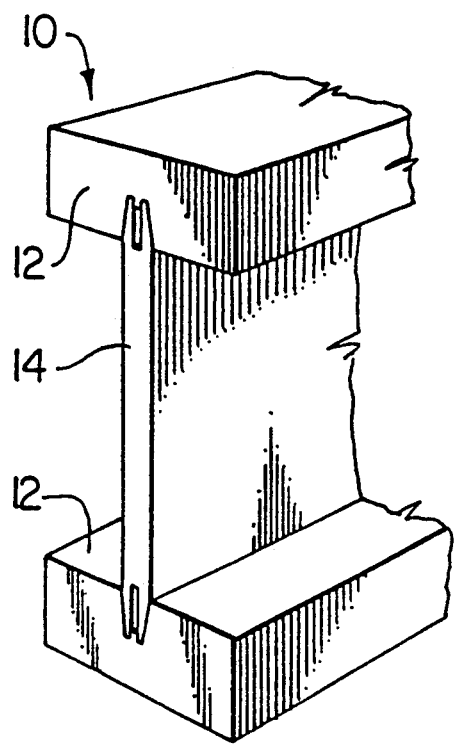
FIG. 1 is a perspective view of one embodiment of a structural member according to the invention.

In the following description, similar features in the drawings have been given similar reference numerals.

As indicated above the invention will be described with reference to the illustrated I-beam.

The I-beam 10 comprises a pair of flanges 12 joined by web 14. The opposed surfaces 16 and 18 of I-beam 10 contain grooves 20 and 22, and compression ridges 24 and 26, respectively. The longitudinal edge sections 28 and 30 of web 14 are inserted into grooves 20 and 22 respectively and secured there by gluing.

Figure 2:
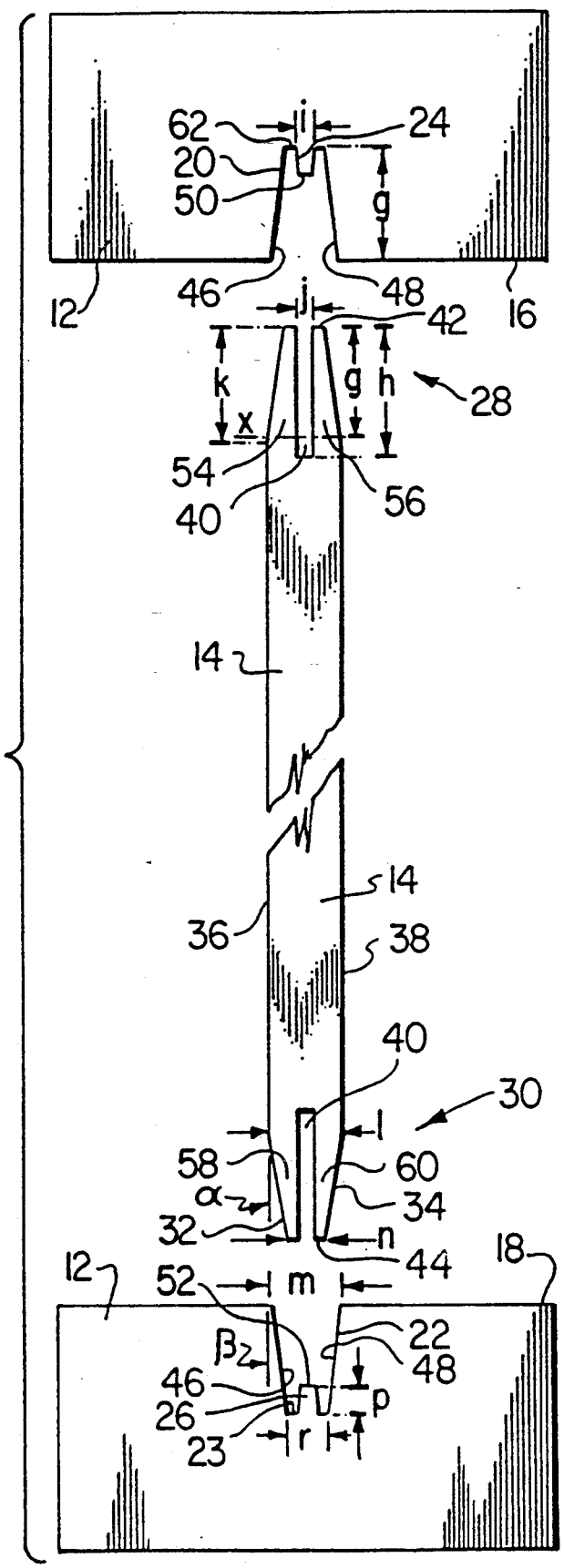
FIG. 2 is an exploded schematic view in section of the edge of the structural member of FIG. 1.

FIG. 2 illustrates in detail the edge treatment of web 14 and the groove treatment of flanges 12. The outer surfaces 32 and 34 in the area of edge sections 28 and 30 are tapered at an angle $\alpha$ to the opposed surfaces 36 and 38 of web 14 proper. Angle $\alpha$ may for convenience be termed the angle of taper of the web.

Kerfs 40 are cut into and extend longitudinally of each of edge extremities 42 and 44 of web 14.

The side surfaces 46 and 48 of grooves 20 and 22 are tapered at an angle $\beta$ to the perpendicular. The angle $\beta$ may be termed for convenience the angle of taper of the groove.

In the preferred embodiment the angle $\alpha$ is greater than the angle $\beta$, prior to insertion of the edge sections 28 and 30 of web 14 into the grooves 20 and 22.

The upstanding compression ridges 24 and 26 are preferably of essentially rectangular cross-section with their tops 50 and 52 respectively running longitudinally along the center of the grooves. The essentially rectangular shape of the compression ridges is highly preferred, particularly toward the bottom of the ridge. A cross-section is required which will serve to deflect the extremities 42 and 44 of legs 54 and 56, and 58 and 60 respectively toward the groove side surfaces 46 and 48 without at the same time inducing out-thrusting components of force which would tend to push the web back out of the groove.

In the preferred case the outer edges of kerfs 40 at the extremities 42 and 44 of web 14 are slightly rounded (not shown).

Similarly, the top of the ridges 24 and 26 may be rounded off or otherwise profiled, such as by bevelling.

The relative dimensions of various of the parts of the joint are of importance. A number of these relationships pertain to the components prior to insertion of the edges of the web into the grooves.

Thus, prior to insertion the thickness x of the edge section 28, 30 at a distance g from the extremity 42, 44 is greater than the width m of the groove 20, 22 at the surface 16, 18 of flanges 12. The depth h of kerfs 40 is greater than the depth g of grooves 20 and 22.

The width i of the base of compression ridge 24 is equal to or preferably sightly greater than the width j of kerf 40.

The overall thickness n of the extremity 44 of web 14 prior to insertion is preferably not greater than and most preferably less than the width r of the bottom of groove 22.

The depth g of the groove 20 is preferably not greater than the depth k of the edge taper of web 14 and in the most preferred case g is less than k. Thus k is preferably greater than g.

Finally, the height p of the compression ridge 26 is less than the depth g of the groove 22 and it is highly preferable that this height p be very much less than the depth g.

While the preferred configuration as illustrated includes a taper on both sides of the web edges, and grooves both sides of which correspondingly taper, the invention could be utilized with a web only one side of which is tapered with a corresponding side of the groove tapered.

While the description has referred in some cases to parts of the upper joint and in some cases to parts of the lower joint a viewed in FIG. 2, it will be understood that the two joints are intended to be identical.

Figure 3:
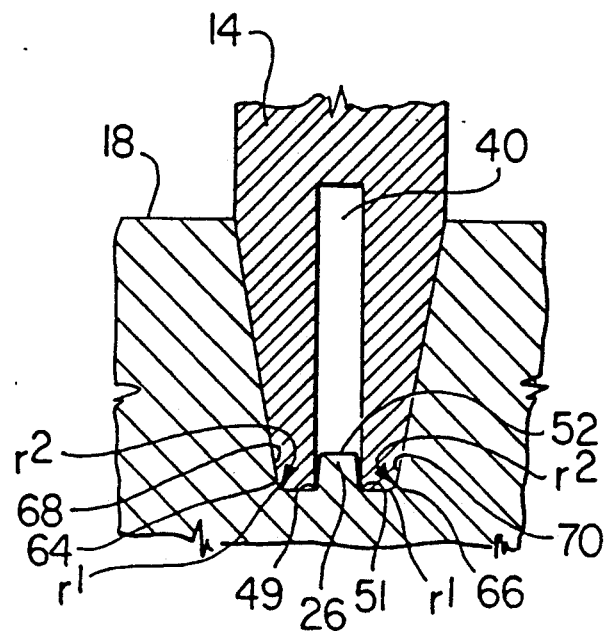
FIG. 3 is a schematic in section of an assembled joint between the web and flange of the embodiment of FIG. 1.

FIG. 3 illustrates an assembled joint according to the invention. The joint of FIG. 3 is the same in all respects as that shown in FIG. 2 with the exception that the inner edges 64 and 66 of groove 22 and the outer extremities 68 and 70 of legs 58 and 60 have been correspondingly rounded at $R^1$ and $R^2$ respectively.

Figure 3A:
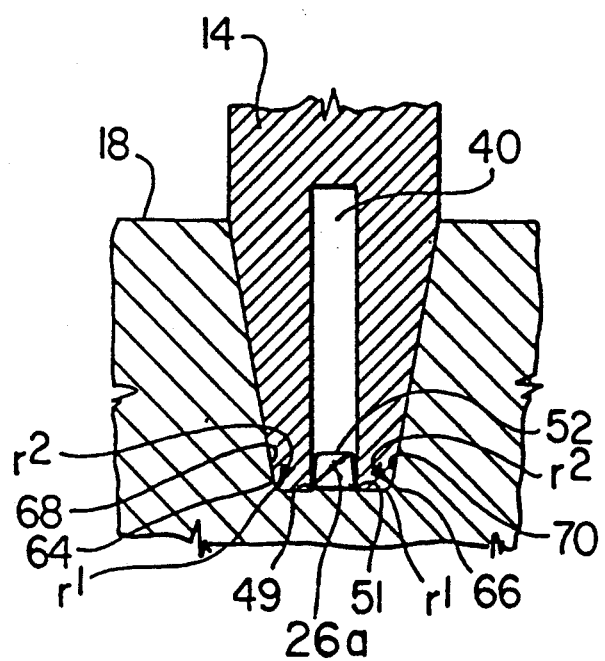
FIG. 3a illustrates a modification of the embodiment of the invention shown in FIG. 3.

In the embodiment shown in FIG. 3, the compression ridge 26 is integral with the remainder of the flange. In the embodiment shown in FIG. 3a, however, the compression ridge is a component separate from the remainder of the flange.

A typical thickness of the web 14 would be about 11.1 mm. The width r at the bottom 23 of groove 22 would be about 8.5 mm (in the absence of the rounded corners) and at the surface 16 width m would be about 10.5 mm. The depth g of the groove is about 16 mm. Prior to insertion of the edge section 30 into the groove 22, the width n of the web at the edge extremity 44 is about 8.0 mm (in the absence of the rounded corners) and the width at a distance 16 mm inward of the edge 44 is about 10.55 mm. The width j of the kerf is about 2.0 mm. The height p of the compression ridges 24 and 26 is typically about 2.5 mm. The width i of the base of the compresion ridge is preferably chosen to give about a 0.5 mm spread at the extremity of legs 54 and 56, and 58 and 60 when the web is fully inserted.

The depth h of the kerf 40 is in the preferred case about 18 mm for a groove depth g of 16 mm.

The flange is typically nominal 2×4 or 2×3 in.

The radii $R^1$ and $R^2$ may be about 2 mm.

Thus it is apparent that there has been provided in accordance with the invention a wooden structural member that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and scope of the invention.

What we claim as our invention:

1. A wooden structural member comprising:
   a pair of elongated flanges each having a surface and a longitudinally extending groove in said surface, each said groove having first and second sides and a bottom, and wherein at least one said side of each said groove is at an angle to said surface such that each said groove is tapered from said surface to said bottom;
   an upwardly projecting compression ridge extending longitudinally along said bottom of each said groove, said ridge having a base; and
   a web disposed between said flanges and having first and second longitudinal edges, said edges having first and second sides, at least one said side of said edges being tapered, one of said edges secured within each said groove, and each of said edges having a longitudinally extending central kerf therein, the depth of each said kerf being greater than the depth of each said groove; and wherein (a) prior to the insertion of one of said edges into each said groove, (i) the thickness of each of said edges at its extremity is not greater than the width of said bottom of said groove, and (ii) the thickness of each of said edges at a distance from its extremity equal to the depth of each said groove is greater than the width of each said groove at said surface of said flange, (b) the width of said compression ridge at said base is at least equal to the width of said kerf at its outer extremity; and (c) the height of said ridge is substantially less than the depth of said kerf.

2. The structural member of claim 1, wherein said first and second sides of each said groove and said first and second sides of said edges are tapered.

3. The structural member of claim 2, wherein said kerf remains partly open over substantially all of its depth after said insertion.

4. The structural member of claim 1, wherein said compression ridge is a separate component from said flange.

5. The structural member of claim 1, wherein said compression ridge is integral with said bottom of said groove.

6. The structural member of claim 1 wherein said ridge comprises in addition first and second sides depending from said bottom of said groove and wherein said first and second sides are approximately perpendicular to said bottom of said groove to thereby avoid undue outward thrust from said first and second sides acting on said edges of said web.

7. The structural member of claim 1, wherein said compression ridge is of rectangular or slightly trapezoidal cross-section.

8. The structural member of claim 1 wherein said compression ridge is slightly tapered.

9. The structural member of claim 1, wherein said compression ridge is located centrally along said bottom of said groove.

10. The structural member of claim 1, wherein said compression ridge is of rectangular or slightly trapezoidal lower cross-section, wherein said ridge has a top, and wherein said top of said ridge runs centrally along said groove.

11. The structural member of claim 1, wherein the width of said compression ridge at its base is greater than the width of said kerf at its outer extremity prior to said insertion.

12. The structural member of claim 1, wherein the width of each said groove at said bottom is equal to or greater than the thickness of said edges at their extremities prior to insertion.

13. The structural member of claim 12 wherein the width of each said groove at said bottom is greater than the thickness of said edges at their extremities prior to insertion.

14. The structural member of claim 1, wherein said longitudinal edges are rounded at their extremities.

15. The structural member of claim 14, wherein said bottom has edges and wherein said edges of said bottom are rounded.

16. The structural member of claim 1, wherein prior to said insertion, the angle at which said groove tapers from said surface to said bottom is less than the angle at which said longitudinal edges taper.

17. The structural member of claim 1, wherein the material of said flanges is chosen from lumber, machine stress rated lumber, laminated veneer lumber or parallel strand lumber.

18. The structural member of claim 17, wherein the material of said web is chosen from waferboard, oriented strand board, fiberboard or plywood.

19. The structural member of claim 18, wherein the material of said web is oriented structural board.

20. The structural member of claim 19, wherein the material of said flange is machine stress rated lumber.

21. The structural member of claim 1, wherein the taper of said tapered edge begins at a distance inwardly of said extremity equal to or greater than the depth of said groove.

22. The structural member of claim 21, wherein said taper begins at a distance inwardly of said extremity greater than the depth of said groove.

23. The structural member of claim 1, wherein said kerfs have edges at outer extremities and wherein said edges of said outer extremities of said kerfs are slightly rounded.

24. A method for the production of wooden structural members comprising:
   forming a longitudinal tapered groove, having a bottom, in a surface of each one of a pair of elongated flanges;

positioning an upwardly projecting compression ridge longitudinally along said bottom of said groove;

tapering the longitudinal edges of a web such that the thickness of the edges at their extremities is not greater than the width of the bottom of the grooves, and the thickness of the edges at a distance from their extremities equal to the depth of the grooves is greater than the width of the grooves at the surface of the flanges; and forming a longitudinally extending central kerf in said edges, said kerf having a greater depth than the depth of said grooves and a much greater depth than the height of said ridge;

applying glue to at least one of either the exterior surfaces of said edges or the interior surfaces of said groove; and inserting said edges into said grooves with said compression ridge projecting into said kerf.

25. The method of claim 24 comprising forming said compression ridge integral with said bottom of said groove.

26. The method of claim 23 comprising forming the sides of said ridge depending from said bottom to be approximately perpendicular to said bottom.

27. The method of claim 24 comprising forming the extremity of said edges at the same or less thickness than the width of the bottom of said groove, and the base of said ridge at at least as great a width as the width of said kerf.

28. The method of claim 27 comprising forming the base of said ridge with a width greater than the width of said kerf and the extremities of said edges with a thickness less than the width of said bottoms of said grooves.

29. The method of claim 22 comprising forming said ridge with a triangular cross-section and an apex extending centrally of said groove.

30. The method of claim 24 comprising the additional step of rounding the interior corners of said groove and the exterior corners of said edges.

31. The method of claim 24 comprising forming said tapered grooves and tapering said edges such that the angle of taper is less in the grooves than on the edges.

32. The method of claim 24 comprising tapering said edges such that the depth of the taper is at least equal to the depth of said grooves.

33. The method of claim 24 comprising slightly rounding the outer extremities of said kerfs.

34. The method of claim 26 comprising rounding off or bevelling the outer extremities of said sides of said ridge.

35. The structural member of claim 1 further comprising a layer of glue between said edges and said grooves.

36. The structural member of claim 35 wherein said glue is chosen from the group consisting of phenol-resorcinol formaldehyde, melamine formaldehyde resin, and isocyanates.

* * * * *